US008591186B2

(12) United States Patent
Christensen

(10) Patent No.: US 8,591,186 B2
(45) Date of Patent: Nov. 26, 2013

(54) NACELLE FOR WIND TURBINE

(75) Inventor: Jonas Bojer Christensen, Mariager (DK)

(73) Assignee: Vestas Wind Systems A/S, Aarhus N (DK)

( * ) Notice: Subject to any disclaimer, the term of this patent is extended or adjusted under 35 U.S.C. 154(b) by 558 days.

(21) Appl. No.: 12/947,376

(22) Filed: Nov. 16, 2010

(65) Prior Publication Data

US 2011/0142616 A1    Jun. 16, 2011

Related U.S. Application Data

(60) Provisional application No. 61/261,785, filed on Nov. 17, 2009.

(30) Foreign Application Priority Data

Nov. 17, 2009    (DK) .................................. 2009 70210

(51) Int. Cl.
  *F03D 11/00*    (2006.01)
(52) U.S. Cl.
  USPC ........................................................ 415/232
(58) Field of Classification Search
  USPC ......................................... 52/40, 79.1, 653.1
  See application file for complete search history.

(56) References Cited

U.S. PATENT DOCUMENTS

2011/0097202 A1*    4/2011    de Buhr et al. ................ 415/201

FOREIGN PATENT DOCUMENTS

| DE | 103 40 560 | 4/2005 |
|---|---|---|
| DE | 10 2006 001 931 | 7/2007 |
| EP | 2 063 119 | 5/2009 |
| WO | 2008/006377 | 1/2008 |

OTHER PUBLICATIONS

Carsten Nielsen; First Technical Examination Report issued in Denmark patent application No. PA 2009 70210; Jul. 2, 2010; 4 pages; Denmark Patent and Trademark Office.

* cited by examiner

*Primary Examiner* — Richard Edgar
(74) *Attorney, Agent, or Firm* — Wood, Herron & Evans, LLP

(57) ABSTRACT

A nacelle for a wind turbine comprises a plurality of walls connected with each other to define an internal space of the nacelle. A support beam is disposed at an inner surface of the connecting area of at least one set of contiguous walls of the plurality of walls, and a portion of the support beam contacting the contiguous walls has a shape mating with that of the inner surface of the connecting area. The nacelle for a wind turbine is simple in structure, convenient to transport, easy to assemble and strong in the mechanical connecting strength.

19 Claims, 4 Drawing Sheets

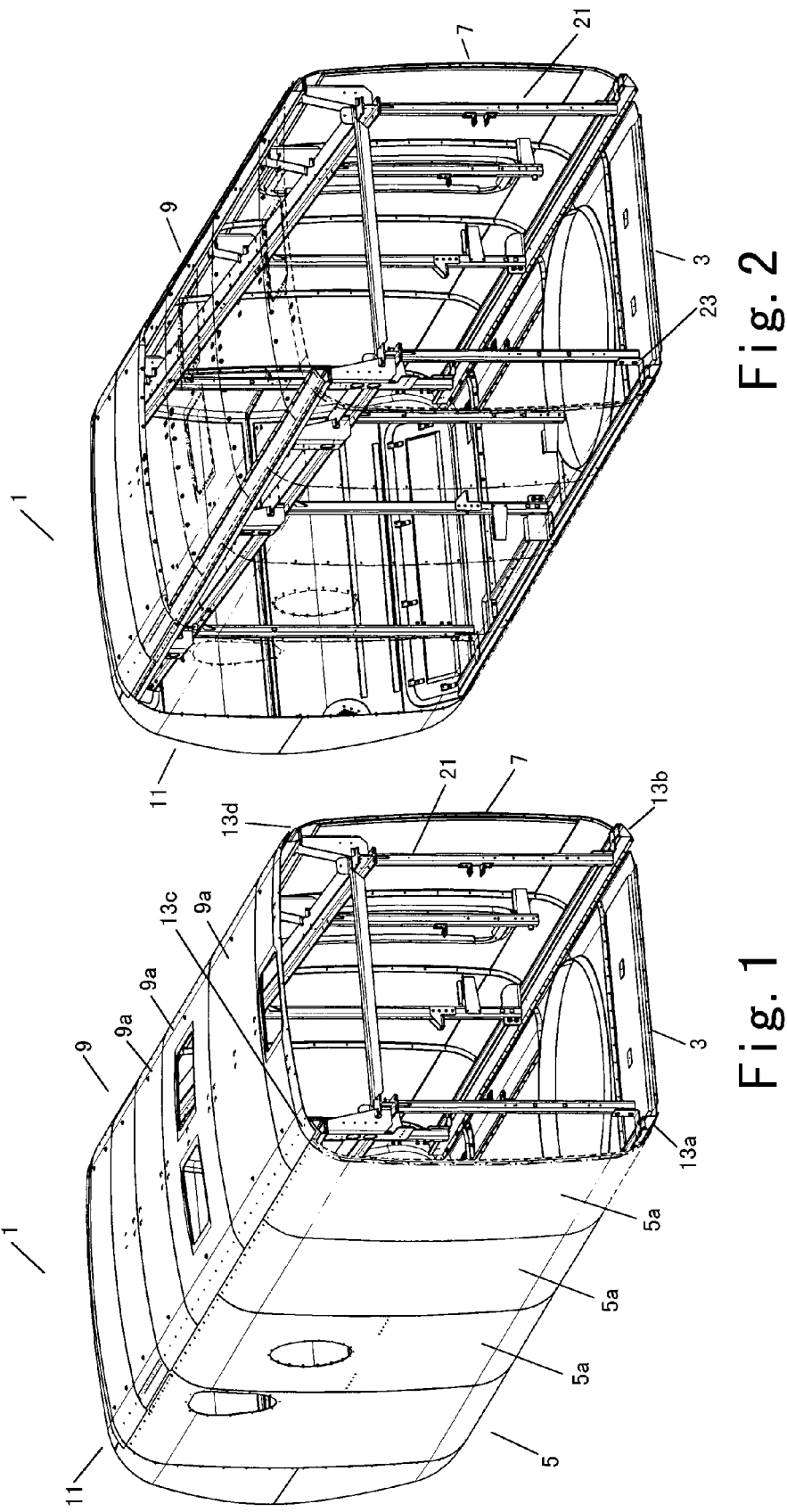

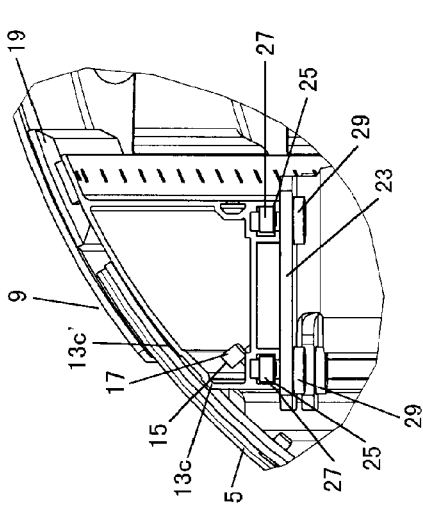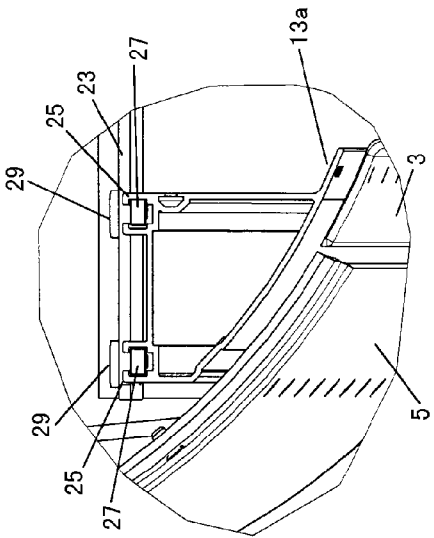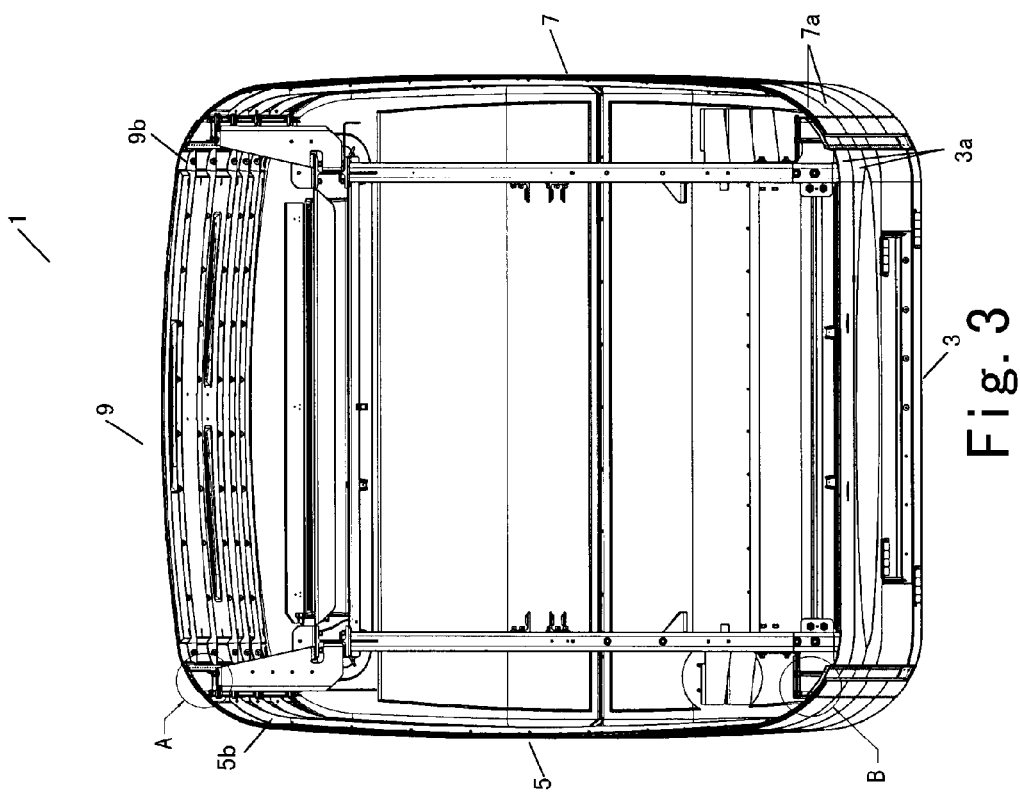

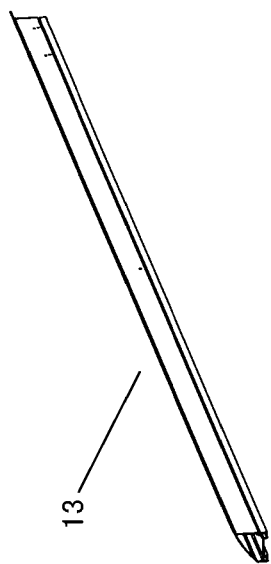
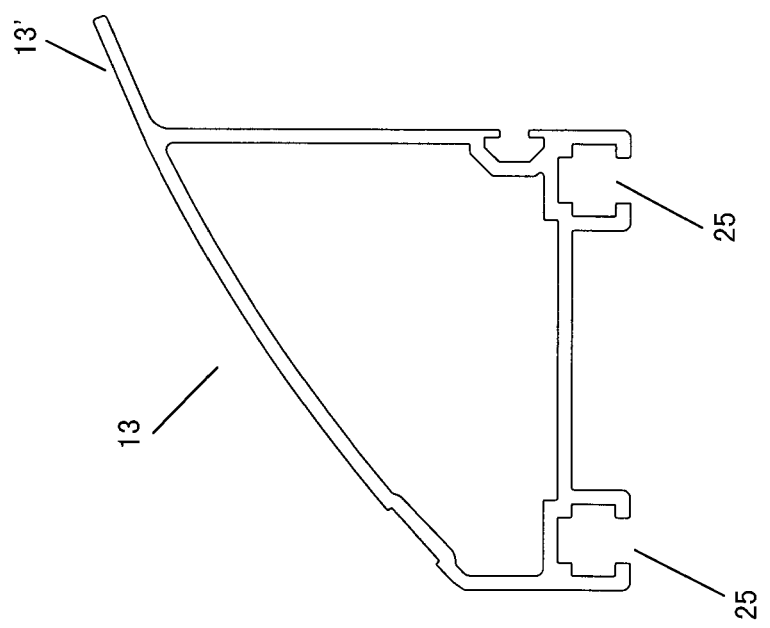
Fig. 6B
Fig. 6A

NACELLE FOR WIND TURBINE

CROSS-REFERENCE TO RELATED APPLICATION

This application claims the benefit of U.S. Provisional patent application No 61/261,785, filed Nov. 17, 2009. This application also claims priority under 35 U.S.C. §119(a) to Danish Patent Application No. PA 2009 70210, filed Nov. 17, 2009. Each of these applications is incorporated by reference herein in its entirety.

TECHNICAL FIELD

The invention relates to a field of wind turbines, and especially to a nacelle for a wind turbine.

BACKGROUND

With energy shortage and environment deterioration, wind power generation plays a more and more important role as being renewable and environment-friendly. A wind turbine for wind power generation generally comprises a tower, a nacelle located at the top of the tower and a rotor located at one end of the nacelle. The nacelle is generally provided therein with a transmission system, a braking system, a yawing system, a control system and an electrical generator etc. Increasing larger wind turbines require larger and larger nacelles with resulting transport and assembly difficulties. To address this problem, the nacelle generally comprises a plurality of parts which may be assembled together instead of an integral structure.

For example, WO2007/132408 discloses a nacelle for a wind turbine which comprises a plurality of plate-shaped elements. The plate-shaped elements are elongated along a longitudinal direction of the nacelle. Two contiguous plate-shaped elements are connected together by two L-shaped angle brackets, wherein each angle bracket is connected with one of two plate-shaped elements respectively and two angle brackets are also connected with each other. WO2007/132408 also discloses another connecting manner: a T-shaped slot is made in one plate-shaped element, a transverse groove is made in the other plate-shaped element, a tapered section of a lock plate with a threaded bolt is inserted in and under a narrow slot of the T-shaped slot of the one plate-shaped element with the threaded blot in the overlaying groove of the other plate-shaped element, and the two plate-shaped elements are subsequently assembled by tightening a nut and a washer.

US2009/0191051 discloses a stackable nacelle for a wind turbine comprising a plurality of stackable pieces. Each piece has a flange formed at its edge periphery and extending outwardly, and the flanges of two contiguous pieces may be secured together by means of bolts to form an integral nacelle.

These conventional nacelles are not only complicated in structure and difficult to assemble but also have a weak mechanical connecting strength between two contiguous parts of the nacelles. These nacelles are used under strong wind in an outdoor environment. The nacelle with weak mechanical connecting strength may be deformed and even destroyed under strong wind such that the wind turbine can not operate normally.

Thus, there is a need to provide an improved nacelle for a wind turbine.

SUMMARY

Aspects of the present invention overcome the problems or disadvantages in the prior art and provide a nacelle for a wind turbine which is simple in structure, convenient to transport, easy to assemble and strong in the mechanical connecting strength.

According to the present invention, a nacelle for a wind turbine is provided. The nacelle comprises a plurality of walls connected with each other to define an internal space of the nacelle, wherein a support beam is disposed at an inner surface of the connecting area of at least one set of contiguous walls of the plurality of walls, and a portion of the support beam contacting the contiguous walls has a shape mating with that of the inner surface of the connecting area.

Preferably, the inner surface of the connecting area of the at least one set of contiguous walls is in a curved shape, and the portion of the support beam contacting the contiguous walls has a curved shape mating with that of the inner surface of the corresponding connecting area.

Preferably, the at least one set of contiguous walls are longitudinal walls, and the support beam is a longitudinal support beam.

Preferably, the support beam is hollow.

Preferably, the at least one set of contiguous walls each comprise a plurality of wall segments, each of the wall segments has flanges formed at its edges and perpendicularly and inwardly extending, and the contiguous wall segments are connected closely with each other by means of the perpendicularly and inwardly extending flanges.

Preferably, the support beam is formed with at least one slot into which a connecting bar can be inserted and retained without falling off.

Preferably, the plurality of walls comprises a bottom wall, a first side wall, a second side wall opposite to the first side wall, a top wall, a rear end wall and a front end wall, the longitudinal support beam is disposed at an inner surface of the connecting area of two contiguous walls of the bottom wall, the first side wall, the second side wall and the top wall, and the two contiguous walls are secured to the longitudinal support beam.

Preferably, the portion of the longitudinal support beam contacting the two contiguous walls has a curved shape mating with that of the inner surface of the connecting area.

Preferably, the longitudinal support beam is hollow.

Preferably, the two contiguous walls are spliced together.

Preferably, the longitudinal support beam is provided with hollow sleeves in which an internal thread is formed so that the bolts for securing the two contiguous walls are threaded into the hollow sleeves respectively.

Preferably, the top wall is overlapped partly over the first side wall and the second side wall.

Preferably, an underlay is disposed between the top wall and the longitudinal support beam.

Preferably, a plurality of thread holes are formed in the underlay.

Preferably, at least one wall of the bottom wall, the first side wall, the second side wall and the top wall comprises a plurality of transverse wall segments.

Preferably, the transverse wall segments have flanges formed at its transverse edges and perpendicularly and inwardly extending, and the contiguous transverse wall segments are connected closely with each other by means of the perpendicularly and inwardly extending flanges.

Preferably, the rear end wall and the front end wall are attached to a nacelle body formed by the bottom wall, the first side wall, the second side wall and the top wall.

Preferably, the longitudinal support beam is formed with at least one longitudinal slot into which a connecting bar with thread holes can be inserted and retained without falling off.

Preferably, the longitudinal support beam has a projection longitudinally formed on at least one side of the hollow portion contacting the two contiguous walls.

The support beam may be made of any suitable materials but preferably of aluminium. The nacelle may be made of any suitable materials but preferably of glass fibre. The nacelle may be made in any suitable size.

In the nacelle for the wind turbine according to an embodiment of the present invention, the support beam is disposed at the inner surface of the connecting area of at least one set of contiguous walls of the plurality of walls, and the portion of the support beam contacting the contiguous walls has a shape mating with that of the inner surface of the connecting area such that the mechanical connecting strength between two contiguous walls is strong. As a result, the nacelle may sustain strong wind in the outdoor environment and prevents itself from being deformed and destroyed, thereby ensuring that the wind turbine operates normally. Furthermore, the nacelle for the wind turbine according to an embodiment of the present invention is simple in structure, convenient to transport and easy to assemble. The walls forming the nacelle and the support beam may be transported easily to other work sites, or between countries, or to the actual wind site so that it can be assembled on site or other work sites.

BRIEF DESCRIPTION OF THE DRAWINGS

Other aspects and features of the present invention will become apparent from the following detailed description, taken in conjunction with the drawings in which:

FIG. 1 is a perspective view showing a portion of a nacelle for a wind turbine according to an embodiment of the present invention, in which a main frame is mounted within the nacelle;

FIG. 2 is a perspective view similar to FIG. 1, but with some walls removed;

FIG. 3 is a front side view of the nacelle shown in FIG. 1;

FIG. 4A is an enlarged view of a circled portion A of FIG. 3;

FIG. 4B is an enlarged view of a circled portion B of FIG. 3;

FIG. 6A is an end view of the support beam according to an embodiment of the present invention; and FIG. 6B is a perspective view of the support beam according to an embodiment of the present invention.

DETAILED DESCRIPTION

Figure 5:
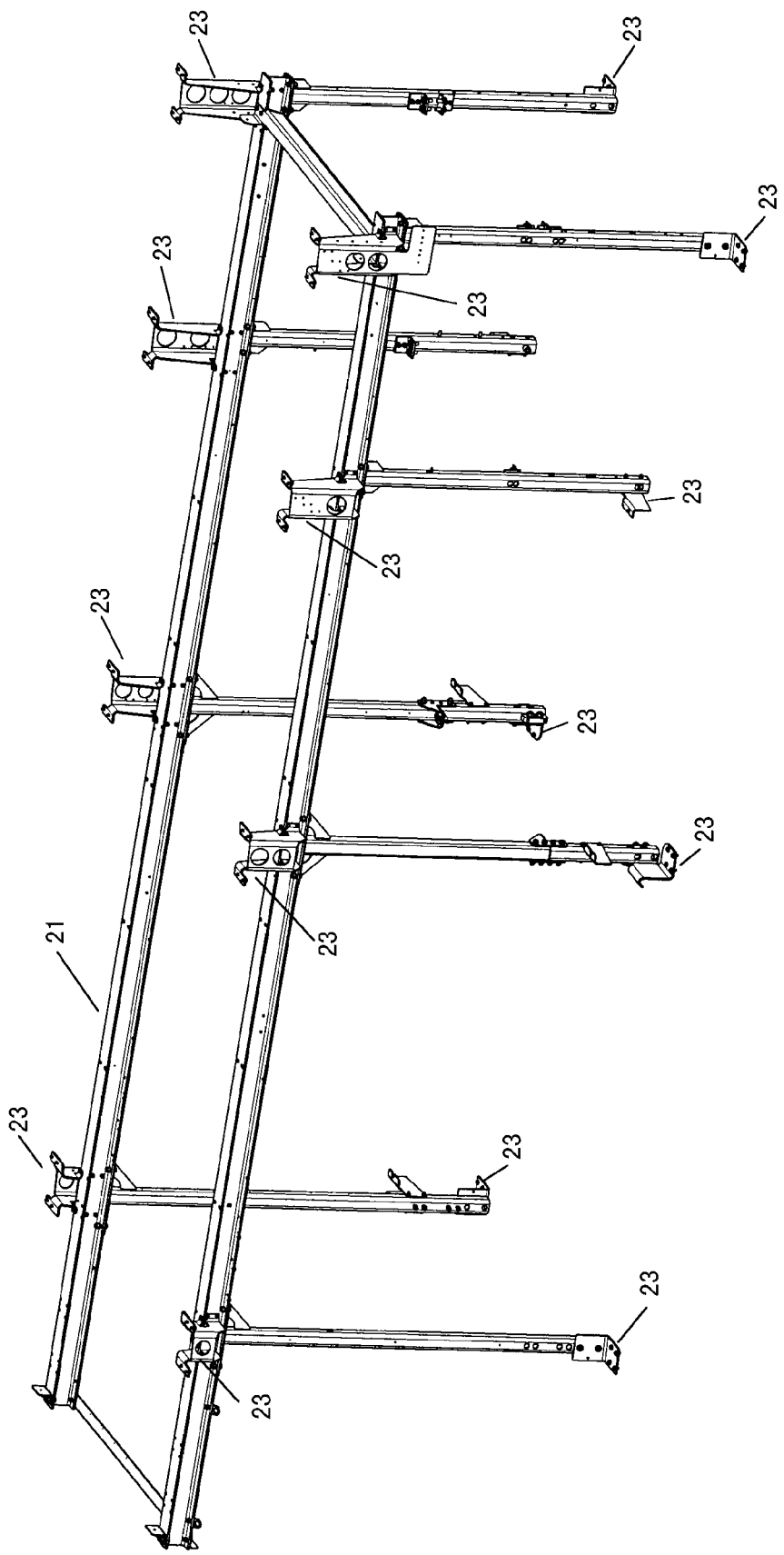
FIG. 5 is a perspective view of the main frame shown in FIG. 1.

A nacelle 1 for a wind turbine according to an embodiment of the present invention will be described in detail with reference to the drawings. The nacelle 1 comprises a bottom wall 3, a first side wall 5, a second side wall 7 opposite to the first side wall 5, and a top wall 9. The nacelle 1 in this embodiment further comprises a rear end cover or rear end wall 11 and a front end cover or front end wall (not shown). These walls are connected with each other to define a generally hexahedral space. Of course, depending on the mounting requirements of other components of the wind turbine, openings may be formed in the walls of the nacelle 1 at the corresponding positions. It should be understood that the nacelle 1 according to various alternative embodiments may be formed in any other suitable shape different from the generally hexahedral shape, such as a generally pentahedral shape or a generally ellipsoidal shape.

According to an exemplary embodiment, a first longitudinal support beam 13a and a second longitudinal support beam 13b are disposed respectively at an inner surface of the connecting areas in which the bottom wall 3 connects with the first side wall 5 and the second side wall 7. The bottom wall 3 and the first side wall 5 are secured respectively to the first longitudinal support beam 13a by means of fasteners such as bolts or rivets etc, and the bottom wall 3 and the second side wall 7 are secured respectively to the second longitudinal support beam 13b by means of fasteners such as bolts or rivets etc. As a result, the bottom wall 3 is connected firmly with the first side wall 5 and the second side wall 7. Similarly, a third longitudinal support beam 13c and a forth longitudinal support beam 13d are disposed respectively at an inner surface of the connecting areas in which the top wall 9 connects with the first side wall 5 and the second side wall 7. The top wall 9 and the first side wall 5 are secured respectively to the third longitudinal support beam 13c by means of fasteners such as bolts or rivets etc, and the top wall 9 and the second side wall 7 are secured respectively to the forth longitudinal support beam 13d by means of fasteners such as bolts or rivets etc. As a result, the top wall 9 is connected firmly with the first side wall 5 and the second side wall 7.

To reduce an impact of the wind on the nacelle 1, the outer surface of the nacelle 1 is often designed to have a streamlined shape. The bottom wall 3, the first side wall 5, the second side wall 7 and the top wall 9 are designed to be curved at least at the connecting areas. To ensure a close and firm engagement between the first longitudinal support beam 13a and the bottom wall 3 and the first side wall 5, the second longitudinal support beam 13b and the bottom wall 3 and the second side wall 7, the third longitudinal support beam 13c and the top wall 9 and the first side wall 5 as well as the forth longitudinal support beam 13d and the top wall 9 and the second side wall 7, the portion of the respective longitudinal support beams contacting the walls has a curved shape mating with that of the inner surface of the respective connecting areas such that the respective longitudinal support beams contact snugly the corresponding walls. The cross section of the longitudinal support beams may be in any desirable shape. To reduce the weight and ensure the connecting strength, the longitudinal support beams are preferably hollow.

FIG. 4A shows that the top wall 9 connects with the first side wall 5 by the third longitudinal support beam 13c. The curved inner surface at the upper end of the first side wall 5 clings to the third longitudinal support beam 13c and is secured to the third longitudinal support beam 13c by means of fasteners (such as bolts or rivets etc) which pass through the first side wall 5 and the third longitudinal support beam 13c. The top wall 9 is spliced with the first side wall 5, the curved inner surface of the top wall 9 also clings to the third longitudinal support beam 13c and is secured to the third longitudinal support beam 13c by means of fasteners which pass through the top wall 9 and the third longitudinal support beam 13c. In order for the operators to work outside of the nacelle without entering into the nacelle during assembling the nacelle, it is preferable to provide a plurality of thread holes 15 in the third longitudinal support beam 13c. The hollow sleeves 17 formed with internal thread and external thread may be threaded into the thread holes 15 in the third longitudinal support beam 13c. The top wall 9 and the first side wall 5 are secured to the third longitudinal support beam 13c by threading the bolts into the internal thread of the hollow sleeves 17. Of course, the hollow sleeves 17 may have no external thread and are secured to the third longitudinal support beam 13c by rivets or other means. The top wall 9 is preferably overlapped partly over the first side wall 5 to prevent the dirt such as sand and dust from entering into the nacelle. Due to the fact that the top wall 9 is overlapped partly over the first side wall 5, there is a gap formed between the top wall 9 and the curved surface 13c' of the third longitudinal support beam 13c. Thus, an underlay 19 is disposed between the top wall 9 and the third longitudinal support beam 13c. A plurality of thread holes are also formed in the underlay 19. The underlay 19 is firstly secured to the third longitudinal support beam 13c by means of the bolts which are threaded into some thread holes in the underlay 19 and the third longitudinal support beam 13c, and the top wall 9 is then secured to the underlay 19 by means of the bolts which are threaded into the top wall 9 and other thread holes in the underlay 19. As a result, the top wall 9 is secured to the third longitudinal support beam 13c.

Preferably, the top wall 9 and the first side wall 5 comprise a plurality of top transverse wall segments 9a and a plurality of first transverse side wall segments 5a respectively to further facilitate the transport. The top transverse wall segments 9a have flanges 9b formed at its transverse edges and perpendicularly and inwardly extending, and the contiguous top transverse wall segments 9a are connected closely with each other by the perpendicularly and inwardly extending flanges 9b. Similarly, the first transverse side wall segments 5a have flanges 5b formed at its transverse edges and perpendicularly and inwardly extending, and the contiguous first transverse side wall segments 5a are connected closely with each other by the perpendicularly and inwardly extending flanges 5b.

The connection among the top wall 9, the second side wall 7 and the forth longitudinal support beam 13d may be realized in the same manner as the connection among the top wall 9, the first side wall 5 and the third longitudinal support beam 13c described above.

FIG. 4B shows that the bottom wall 3 connects with the first side wall 5 by the first longitudinal support beam 13a. The curved inner surface at the lower end of the first side wall 5 clings to the first longitudinal support beam 13a and is secured to the first longitudinal support beam 13a by means of fasteners which pass through the first side wall 5 and the first longitudinal support beam 13a. The bottom wall 3 is spliced with the first side wall 5 and the inner surface of the bottom wall 3 also clings to the first longitudinal support beam 13a and is secured to the first longitudinal support beam 13a by means of fasteners which pass through the bottom wall 3 and the first longitudinal support beam 13a. In order for the operators to work outside of the nacelle without entering into the nacelle during assembling the nacelle, it is preferable to provide a plurality of thread holes in the first longitudinal support beam. The hollow sleeves formed with internal thread and external thread may be threaded into the thread holes in the first longitudinal support beam. The bottom wall and the first side wall are secured to the first longitudinal support beam by threading the bolts into the internal thread of the hollow sleeve. The first side wall 5 is preferably overlapped partly over the bottom wall 3 to prevent the dirt such as sand and dust from entering into the nacelle.

Preferably, the bottom wall 3 comprises a plurality of bottom transverse wall segments 3a to further facilitate the transport. The bottom transverse wall segments 3a have flanges formed at its transverse edges and perpendicularly and inwardly extending and the contiguous bottom transverse wall segments 3a are connected closely with each other by the perpendicularly and inwardly extending flanges.

The connection among the bottom wall 3, the second side wall 7 and the second longitudinal support beam 13b may be realized in the same manner as the connection among the bottom wall 3, the first side wall 5 and the first longitudinal support beam 13a described above.

Similarly, the second side wall 7 may comprise a plurality of second transverse side wall segments 7a to further facilitate the transport. The second transverse side wall segments 7a have flanges formed at its transverse edges and perpendicularly and inwardly extending, and the contiguous second transverse side wall segments 7a are connected closely with each other by the perpendicularly and inwardly extending flanges.

The rear end wall and the front end wall are attached to a nacelle body formed by the bottom wall, the first side wall, the second side wall and the top wall in a known manner in the art.

It is known in the art that a main frame 21 is disposed within the nacelle 1 to support the main components of the wind turbine. FIG. 5 schematically illustrates the main frame 21 in a perspective view. There are a plurality of brackets 23 mounted at the upper and lower portions of the main frame 21 to secure the main frame 21 to the nacelle 1. These brackets may be in different shapes as desired. To facilitate the connection between the main frame 21 and the nacelle 1 and simplify the structure, the longitudinal support beams 13 according to an aspect of the present invention is further formed with at least one longitudinal slot 25. The longitudinal support beams 13 in the FIGS. 6A and 6B are shown to have two longitudinal slots 25. A connecting bar with thread holes may be inserted into the longitudinal slot from the longitudinal end of the longitudinal support beam and retained in the longitudinal slot. Furthermore, the longitudinal support beams 13 according to one embodiment of present invention have a projection longitudinally formed on one side of the hollow portion contacting the walls of the nacelle, but may have no projection longitudinally formed on one side of the hollow portion contacting the walls of the nacelle or have projections longitudinally formed on either side of the hollow portion contacting the walls of the nacelle.

FIG. 4A shows that the connecting bars 27 with thread holes are inserted into the longitudinal slots 25 from the longitudinal end of the third longitudinal support beam 13c. The shape of the longitudinal slots 25 ensures that the connecting bars 27 are retained in the longitudinal slots 25 without falling off. The bolts 29 pass through the bracket 23 disposed at the upper portion of the main frame 21 and are threaded into thread holes of the connecting bars 27 retained in the longitudinal slots 25 such that the main frame 21 is connected with the third longitudinal support beam 13c. The main frame 21 may be connected with the forth longitudinal support beam 13d in a similar way.

FIG. 4B shows that the connecting bars 27 with thread holes are inserted into the longitudinal slots 25 from the longitudinal end of the first longitudinal support beam 13a and retained in the longitudinal slots 25. The bolts 29 pass through the bracket 23 disposed at the lower portion of the main frame 21 and are threaded into thread holes of the connecting bar 27 retained in the longitudinal slot 25 such that the main frame 21 is connected with the first longitudinal support beam 13a. The main frame 21 may be connected with the second longitudinal support beam 13b in a similar way.

In the manner described above, the main frame 21 may be secured in the nacelle 1. In practice, it is possible to assemble the nacelle after the longitudinal support beams 13 are secured to the main frame 21 if desired.

Aspects of the present invention have been described with reference to the preferred embodiments. However, it should be understood that the present invention is not limited to the above-mentioned preferred embodiments. Various modifications to the present invention may be made without departing from the protection scope defined in claims of the present invention. For example, the support beam may be non-longitudinal, such as a transverse support beam for the connection between transverse walls. The support beam may also be disposed at an inner surface of an uncurved connecting area. In an exemplary embodiment, the inner surfaces of the connecting areas of all two contiguous walls of the bottom wall, the first side wall, the second side wall and the top wall are provided with a longitudinal support beam. However, it is feasible that only the inner surfaces of the connecting areas of some of all two contiguous walls are provided with a longitudinal support beam. All these modifications fall within the protection scope of the present invention.

What is claimed is:

1. A nacelle for a wind turbine comprising a plurality of walls connected with each other to define an internal space of the nacelle, wherein a support beam is disposed at an inner surface of the connecting area of at least one set of contiguous walls of the plurality of walls, and a portion of the support beam contacting the contiguous walls has a shape mating with that of the inner surface of the connecting area.

2. The nacelle for a wind turbine according to claim 1, wherein the inner surface of the connecting area of the at least one set of contiguous walls is in a curved shape, and the portion of the support beam contacting the contiguous walls has a curved shape mating with that of the inner surface of the corresponding connecting area.

3. The nacelle for a wind turbine according to claim 1, wherein the at least one set of contiguous walls are longitudinal walls, and the support beam is a longitudinal support beam.

4. The nacelle for a wind turbine according to claim 1, wherein the support beam is hollow.

5. The nacelle for a wind turbine according to claim 1, wherein the at least one set of contiguous walls each comprise a plurality of wall segments, each of the wall segments has flanges formed at its edges and perpendicularly and inwardly extending, and the contiguous wall segments are connected closely with each other by means of the perpendicularly and inwardly extending flanges.

6. The nacelle for a wind turbine according to claim 1, wherein the support beam is formed with at least one slot into which a connecting bar can be inserted and retained without falling off.

7. The nacelle for a wind turbine according to claim 1, wherein the plurality of walls comprises a bottom wall, a first side wall, a second side wall opposite to the first side wall, a top wall, a rear end wall and a front end wall, the longitudinal support beam is disposed at an inner surface of the connecting area of two contiguous walls of the bottom wall, the first side wall, the second side wall and the top wall, and the two contiguous walls are secured to the longitudinal support beam.

8. The nacelle for a wind turbine according to claim 7, wherein the portion of the longitudinal support beam contacting the two contiguous walls has a curved shape mating with that of the inner surface of the connecting area.

9. The nacelle for a wind turbine according to claim 7, wherein the longitudinal support beam is hollow.

10. The nacelle for a wind turbine according to claim 9, wherein the longitudinal support beam has a projection longitudinally formed on at least one side of the hollow portion contacting the two contiguous walls.

11. The nacelle for a wind turbine according to claim 7, wherein the two contiguous walls are spliced together.

12. The nacelle for a wind turbine according to claim 7, wherein the longitudinal support beam is provided with hollow sleeves in which an internal thread is formed so that the bolts for securing the two contiguous walls are threaded into the hollow sleeves respectively.

13. The nacelle for a wind turbine according to claim 7, wherein the top wall is overlapped partly over the first side wall and the second side wall.

14. The nacelle for a wind turbine according to claim 13, wherein an underlay is disposed between the top wall and the longitudinal support beam.

15. The nacelle for a wind turbine according to claim 14, wherein a plurality of thread holes are formed in the underlay.

16. The nacelle for a wind turbine according to claim 7, wherein at least one wall of the bottom wall, the first side wall, the second side wall and the top wall comprises a plurality of transverse wall segments.

17. The nacelle for a wind turbine according to claim 16, wherein the transverse wall segments have flanges formed at its transverse edges and perpendicularly and inwardly extending, and the contiguous transverse wall segments are connected closely with each other by means of the perpendicularly and inwardly extending flanges.

18. The nacelle for a wind turbine according to claim 7, wherein the rear end wall and the front end wall are attached to a nacelle body formed by the bottom wall, the first side wall, the second side wall and the top wall.

19. The nacelle for a wind turbine according to claim 7, wherein the longitudinal support beam is formed with at least one longitudinal slot into which a connecting bar with thread holes can be inserted and retained without falling off.

* * * * *